(12) United States Patent
Malsch et al.

(10) Patent No.: US 6,871,913 B2
(45) Date of Patent: Mar. 29, 2005

(54) HEAD REST ADJUSTMENT DEVICE

(75) Inventors: Heiko Malsch, Heiningen (DE); Harald Fischer, Unterensingen (DE)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 10/705,286

(22) Filed: Nov. 10, 2003

(65) Prior Publication Data

US 2004/0160108 A1 Aug. 19, 2004

(30) Foreign Application Priority Data

Nov. 8, 2002 (DE) .................................. 202 17 258 U

(51) Int. Cl.⁷ .......................... B60N 2/427; B60N 2/46; B60R 21/00; B60R 21/055; B60R 22/28
(52) U.S. Cl. ............ 297/410; 297/216.12; 297/216.13; 297/216.14
(58) Field of Search ....................... 297/216.12, 216.13, 297/216.14, 410

(56) References Cited

U.S. PATENT DOCUMENTS

| | | | | |
|---|---|---|---|---|
| 5,378,043 A | * | 1/1995 | Viano et al. ........ | 297/216.12 X |
| 5,795,019 A | * | 8/1998 | Wieclawski ............ | 297/216.12 |
| 6,199,947 B1 | * | 3/2001 | Wiklund ................ | 297/216.12 |
| 6,213,549 B1 | * | 4/2001 | Wieclawski ............ | 297/216.13 |
| 6,250,714 B1 | * | 6/2001 | Nakano et al. ......... | 297/216.12 |
| 6,273,511 B1 | * | 8/2001 | Wieclawski ........ | 297/216.12 X |
| 6,340,206 B1 | * | 1/2002 | Andersson et al. .... | 297/216.14 |
| 6,354,659 B1 | * | 3/2002 | Andersson et al. .... | 297/216.14 |
| 6,416,125 B1 | * | 7/2002 | Shah et al. ............. | 297/216.12 |
| 6,550,865 B2 | * | 4/2003 | Cho ................... | 297/216.12 X |
| 6,565,150 B2 | | 5/2003 | Fischer et al. ......... | 297/216.12 |
| 6,604,788 B1 | * | 8/2003 | Humer .................. | 297/216.13 |
| 6,631,949 B2 | * | 10/2003 | Humer et al. .......... | 297/216.12 |
| 6,631,955 B2 | * | 10/2003 | Humer et al. ........ | 297/216.12 X |
| 6,655,733 B2 | * | 12/2003 | Humer et al. .......... | 297/216.12 |
| 6,719,368 B1 | * | 4/2004 | Neale .................... | 297/216.14 |
| 6,749,256 B1 | * | 6/2004 | Klier et al. ............ | 297/216.12 |
| 6,769,737 B2 | * | 8/2004 | Choi ..................... | 297/216.14 |
| 6,779,840 B1 | * | 8/2004 | Farquhar et al. ....... | 297/216.12 |
| 6,789,845 B2 | * | 9/2004 | Farquhar et al. ....... | 297/216.12 |
| 2002/0043832 A1 | * | 4/2002 | Watanabe .............. | 297/216.13 |
| 2003/0001414 A1 | * | 1/2003 | Humer et al. .......... | 297/216.12 |
| 2003/0011224 A1 | * | 1/2003 | Humer et al. .......... | 297/216.12 |
| 2003/0015897 A1 | * | 1/2003 | Humer et al. .......... | 297/216.12 |
| 2004/0119324 A1 | * | 6/2004 | Humer et al. .......... | 297/216.12 |
| 2004/0124686 A1 | * | 7/2004 | Malsch et al. .............. | 297/410 |

FOREIGN PATENT DOCUMENTS

DE  10 206 894 A1  9/2002

* cited by examiner

Primary Examiner—Rodney B. White
(74) Attorney, Agent, or Firm—Bill C. Panagos

(57) ABSTRACT

A head restraint positioning device is provided for a head restraint of a vehicle seat. The head restraint positioning device includes an impact device movably connected to the head restraint and arranged on a seat back of the vehicle seat in the area of a pelvis of a passenger sitting on the vehicle seat. The impact device includes at least one structural unit that varies in length in response to the application of pressure and that causes a corresponding change in length of the impact device to change the position of the head restraint.

24 Claims, 3 Drawing Sheets

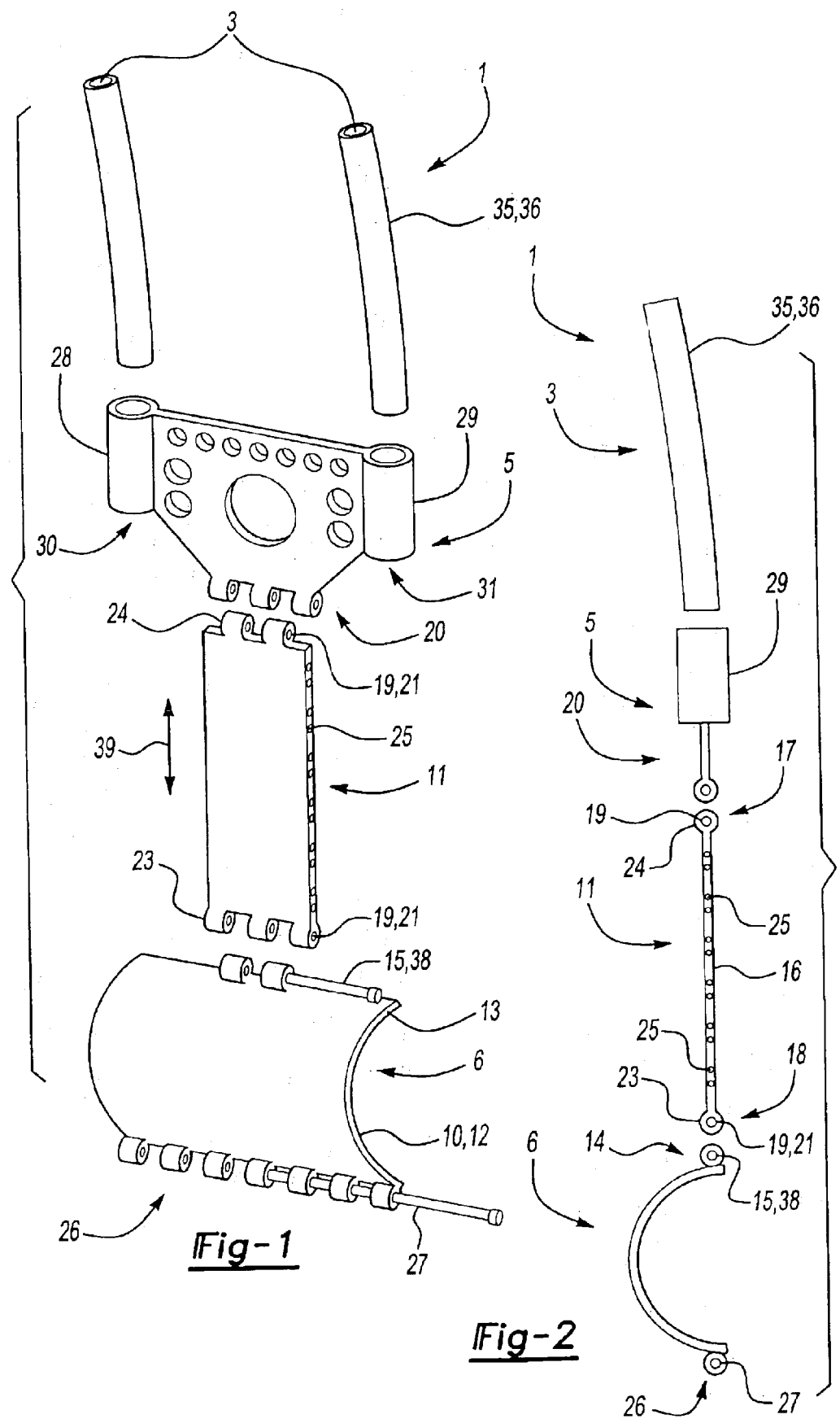

HEAD REST ADJUSTMENT DEVICE

BACKGROUND OF THE INVENTION

1. Field of the Invention

The invention relates to a head restraint positioning mechanism for positioning a vehicle seat head restraint, particularly in the case of a rear-end impact to the vehicle. At least one impact device is arranged on a seat back of the vehicle seat and is movably connected to the head restraint. The impact device is, located in an area adjacent the pelvis of a passenger sitting on the vehicle seat.

2. Background Art

A head restraint positioning mechanism is disclosed in DE 10206894. This mechanism serves to absorb the reaction forces acting on the passenger sitting in the vehicle seat during an impact, particularly a rear-end one, to the vehicle. The head restraint moves in the direction of the head of the passenger, whose head is securely supported by the restraint in case of impact. In this arrangement of the impact device, it must be noted that the center of gravity of the passenger is usually located approximately in the stomach/pelvis area and that, during a rear-end impact to the vehicle, a corresponding force is first exercised on this area. As a result of this force, the area is pressed in the direction of the seat back of the vehicle seat. Only subsequently does the upper part of the body with the head, for example, also move in the direction of the seat back. Because of this, there is usually a gap between the passenger's head and the head restraint, which is at least reduced by the head restraint positioning mechanism. This likewise leads to an avoidance of or at least a reduction in a whiplash injury to the passenger.

The known head restraint positioning mechanism works reliably in this regard and has proven satisfactory in practical application. The cost of such head restraint positioning mechanisms is relatively high. This is due, for example, to the fact that different parts of the head restraint positioning mechanism are separately held in a way that they can pivot and also partially because separate pivoting levers are necessary for a pivoting arrangement of the corresponding parts of this known head restraint positioning mechanism. In addition, it has become apparent that the corresponding effective levers between the individual parts of this known head restraint positioning mechanism are relatively long, so that, on the one hand, this mechanism takes up a lot of room and, on the other hand, larger play is necessary for the different parts of this known head restraint positioning mechanism for positioning of the head restraint.

SUMMARY OF THE INVENTION

The object of the invention is therefore to improve the known head restraint positioning mechanism to the effect that, with a structurally simpler design, it simultaneously allows a positioning of the head restraint that is faster and simultaneously induced by a slighter movement of the passenger.

According to the invention, the impact device presents at least one structural unit with pressure-induced length variation. This means that when there is an impact to the vehicle from the rear and pressure is applied to the seat back by the passenger, there is a change in the length of the structural unit, which is then converted into a corresponding positioning of the head restraint via the moveable connection with the head restraint. With such pressure-induced length variation, the impact device extends in the direction of the head restraint, whereby this length increase leads to a corresponding positioning of the head restraint.

In contrast to the known head restraint positioning mechanism, there is no longer any lever effect, which has to be converted into a displacement of the head restraint by pivoting the corresponding impact device. Instead, the actual length of the impact device is extended, and this length is directly convertible into a positioning of the head restraint.

As a further advantage resulting from the invention, a corresponding pivoting support, with lever effect, of the lever arms or head restraint positioning mechanism components that conspire in the state of the art is no longer necessary and the head restraint positioning mechanism according to the invention has a simpler construction.

Different possibilities are conceivable with regard to the way in which the movable connection between the impact device and head restraint is formed. One possibility is a direct and preferably at least partially articulated connection between the impact device and, for example, one head restraint rod of the head restraint or even the head restraint directly. However, in order to be able to better adjust the head restraint positioning mechanism to the different vehicle seats and to be able to arrange it in the area of a seat back while simultaneously ensuring that the head restraint is securely guided by means of its head restraint rod or head restraint rods, the movable connection of the head restraint and impact device can present at least one guide sleeve. The head restraint rod is put at least partially into this guide sleeve. Preferably, the head restraint rod is kept inside the guide sleeve in a way that it is adjustable, in order to make possible a convenient positioning of the head restraint.

It is possible for this guide sleeve to be directly connected to the impact device. However, in order to keep from having to use the impact device directly for holding the guide sleeve, the movable connection between the head restraint and impact device can continue to present a holding device for the guide sleeve. In this way, the length variation of the impact device is converted to the positioning of the head restraint at least via the holding device and guide sleeve.

In order to be able to adjust the bead restraint positioning mechanism to the corresponding length of the seat back of the vehicle seat in a simple way and at the same time to have to arrange particularly the impact device only in a lower area of the seat back, a connection element, particularly a bar-shaped one, can be arranged between the impact device and holding device. This essentially serves to provide a movable connection between the impact device and holding device.

The structural unit with pressure-induced length variation can be formed in different ways. One example is a structural unit that, for example, reduces its extension in the direction of the passenger when pressure is applied and essentially converts it into a change in length in the direction of the head restraint. A simple realization of such a structural unit can be seen if it is formed as an impact panel with a convex curve, particularly in the direction of the passenger. When pressure is applied by the passenger, the curvature of the impact panel is reduced and converted into a corresponding increase in length.

It is noted that instead of an impact panel with a convex curve, an impact panel with a concave curve can also be used, if the corresponding concave curvature is reduced and converted into an increase in length when pressure is applied by the passenger.

To save material and for a simpler connection to the connection element, it can prove to be advantageous if the impact panel is formed such that its width decreases in the direction of the connection element.

A simplified positioning of the head restraint positioning mechanism to the corresponding passenger seat, as well as to the corresponding application of pressure by the passenger, can result if the impact panel presents a connection device for a pivoting connection to the connection element at least on its upper end. In this way, at least the impact panel and connection element are adjustable to different curvatures in the seat back in a simple way.

In order for it to be possible to arrange the connection element in the seat back, or to arrange it on the seat back, without structural changes, the connection element can be formed as an essentially flat profile. This means that the thickness of the connection element is relatively small in comparison to its crosswise or lengthwise dimension. Furthermore, the bar shape of the connection element results in a relatively small width in comparison to the lengthwise dimension of this element.

For further improved adjustment of the head restraint positioning mechanism to the seat, it can furthermore prove to be advantageous if the connection element presents pivoting connection devices on its upper and/or lower end for mounting, particularly detachable, to the connection element of the impact panel and to an end of the holding device pointing to the connection element. In this way, the head restraint positioning mechanism can be well adjusted to the seat back, particularly in the middle area of the back of a passenger, which is also helpful when using the head restraint positioning mechanism to adjust the head restraint.

Different possibilities are conceivable for implementing the pivoting mechanism device. For example, it would be possible for the pivoting connection device to be formed by corresponding loops, which stick out from the accompanying parts and have a pivoting connection to one another. A further possibility could be seen in forming such a pivoting connection device with a clip connection element. This simplifies the assembly of the different parts, because they need to be simply clipped together.

In order to realize sufficient pivoting in this connection in an easy way, the clip connection element can present at least one bearing shell formed with an essentially semi-circular cross-section. The bearing shell may be clipped to a corresponding counter-element and not only connects the different parts, but also facilitates pivoting.

In order to reduce the weight of the head restraint positioning mechanism without negatively influencing its stability, the connection element can present a number of bore holes, particularly running diagonally to its length. Naturally there is likewise the possibility that corresponding bore holes are also provided in other parts of the head restraint positioning mechanism in order to save on material.

In order to be able to also use the impact device particularly in connection with an impact panel with a convex curvature in the direction of the passenger in combination with a lumbar positioning device of the seat back of the vehicle seat, the impact device can be supported at its lower end on a pivot shaft for a pivoting connection. Because of this pivoting connection, there is a possibility of positioning the seat back in the lumbar region of the passenger so that good support of the lumbar region is provided. Because of this positioning capability, it is also possible for the release of the head restraint positioning mechanism to occur faster, because the impact device is adjustable in the direction of the passenger and the passenger is in contact with the seat back in this area and a corresponding application of pressure during a rear-end impact to the vehicle takes place quickly and directly.

If necessary, it is likewise possible to vary the curvature of the impact panel, by means of which a further positioning possibility in the lumbar region of the passenger results.

In order for the holding device to hold the guide sleeves in an easy way, the holding device can present at least one sleeve retainer for retention of the guide sleeve, particularly in a way that it does not twist. The guide sleeve is simply inserted at least partially into this sleeve retainer, for example.

On head restraints with, for example, two head restraint rods, two guide sleeves can correspondingly be provided in order to be able to simultaneously use these head restraint rods for positioning the head restraint, where these guide sleeves can advantageously be arranged in two sleeve retainers essentially on the side ends of the holding device.

In order to hold the guide sleeve in the sleeve retainer, there can be a connection between the guide sleeve and sleeve retainer that is frictionally engaged, non-positive or interlocking.

The anti-twisting lock between the guide sleeve and sleeve retainer can be implemented in different ways. One example would be anti-twisting cross-sections, such as a polygonal profile or an oval profile. Naturally there is also the possibility that the anti-twisting lock is realized using corresponding guides between the guide sleeve and sleeve retainer or that the anti-twisting lock does not occur directly between the guide sleeve and sleeve retainer, but instead, for example, between the sleeve retainer and/or the guide sleeve and the vehicle seat or its frame.

In order to secure the guide sleeve and sleeve retainer to one another in the corresponding relative position in an easy way, the guide sleeve can lock or clip with or in the sleeve retainer.

It is known that the head restraint presents a convenient positioning relative to the seat back, through which it can be adjusted to passengers of different sizes, for example. This convenient positioning can be realized by means of a corresponding positioning of the head restraint rod within the corresponding guide sleeve, by holding the head restraint rod in the guide sleeve in a way that it can be shifted.

In order to be able to attach the head restraint positioning mechanism to the vehicle seat in an easy way, particularly to the seat's back, the head restraint positioning mechanism can be mounted, particularly detachably, to the frame of the vehicle seat. This attachment can be done, on the one hand, using the pivot shaft at the lower end of the impact device and, on the other hand, using a sliding support of the guide sleeve. The head restraint positioning mechanism can be pre-mountable and then attached to the frame as a finished component in the appropriate way. Furthermore, there is the possibility that the head restraint positioning mechanism is detachably mounted to a separate supporting device, which then, together with the head restraint positioning mechanism, is first mounted on the actual vehicle seat and particularly on its frame, in the area of the seat back.

During a rear-end impact the head restraint may not be adjusted only vertically or upwards, but also forward in the direction of the head, i.e., in the direction in which the vehicle is traveling. For example, this can be done in that one of the components of the head restraint positioning mechanism is restrictedly guided in the appropriate way. However, in order to change the design of the seat back or the corresponding frame as little as possible in this connection, a link guide can be formed between the guide sleeve and vehicle seat. This link guide serves to move the guide sleeves relative to the vehicle seat and the seat back during the release of the impact device in such a way that the head restraint is additionally moved forward in the direction of the passenger's head. With this movement, it can be sufficient if the corresponding variation in the length of the component of the impact device moves the head restraint forward in the direction of the passenger's head. In other cases, it may prove to be advantageous if the length variation is converted both into a forward movement and an upward one. For example, the link guide can be formed in the way that at least one guide element sticks out from the guide sleeve, and that this guide element engages the seat back with a corresponding guide on the vehicle seat.

In order to be able to arrange such a guide in the vehicle seat even at a later time, a retaining sleeve for at least partial retention of the guide sleeve can be arranged on the frame of the vehicle seat, whereby the link guide is formed between the retaining sleeve and the guide sleeve.

It is possible that the release of the head restraint positioning mechanism occurs only one time, i.e., that practically a new head restraint positioning mechanism or at least a new structural unit with pressure-induced length variation must be installed after a corresponding impact with release of the head restraint positioning mechanism. In this way, proper function of the head restraint positioning mechanism is ensured in all cases. There is, however, also the possibility that at least this impact device's structural unit is formed of an elastically workable material, so that it completely moves back into its original form after a release of the head restraint positioning mechanism, so that it is possible to release it more than one time without impairing safety. Examples of such elastically workable materials are different plastics or also metals. Other components of the head restraint positioning mechanism can likewise be produced from plastic material or metal.

In order to be able to produce the pivoting connection between the connection element and impact device in a simple way, the impact device can present a clip-on shaft on its upper end for the lower end of the connection element. Because of the length variation of the impact device, it must be observed that this should be fastened only to its lower end with regard to the seat back or its frame or with regard to the above-mentioned supporting device.

BRIEF DESCRIPTION OF THE DRAWINGS

FIG. 1 a perspective front view of an embodiment of the head restraint positioning mechanism according to the invention;

FIG. 2 is a side view of the embodiment according to FIG. 1;

DETAILED DESCRIPTION OF THE PREFERRED EMBODIMENTS

Figure 3:
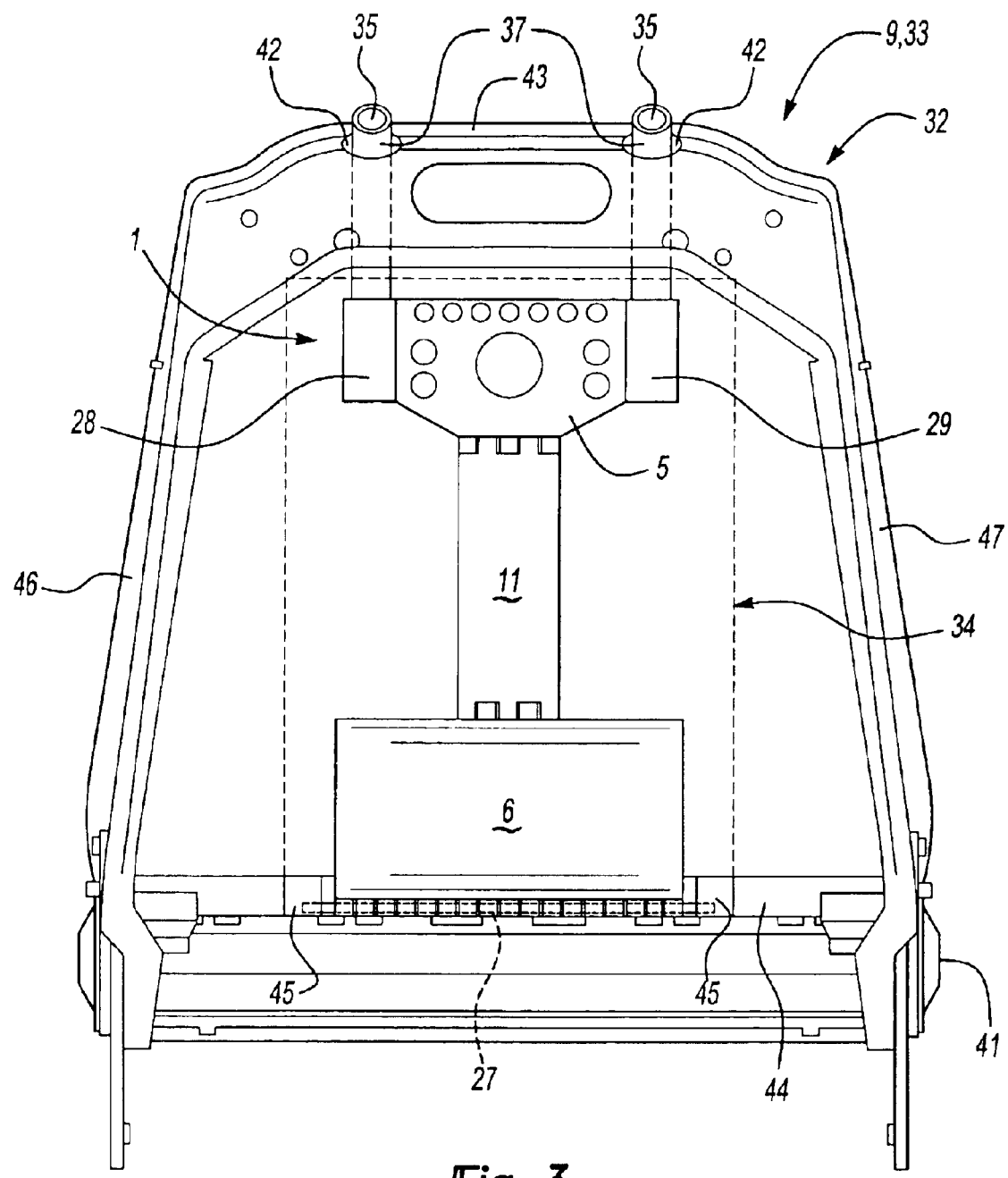
FIG. 3 is an embodiment according to FIG. 1 built into a seat back of a vehicle seat.

FIG. 1 shows a perspective front view of an embodiment of the head restraint positioning mechanism 1 according to the invention with different components in an exploded representation.

The head restraint positioning mechanism 1 includes two guide sleeves 3, a holding device 5, a connection element 11 and an impact device 6.

Figure 4:
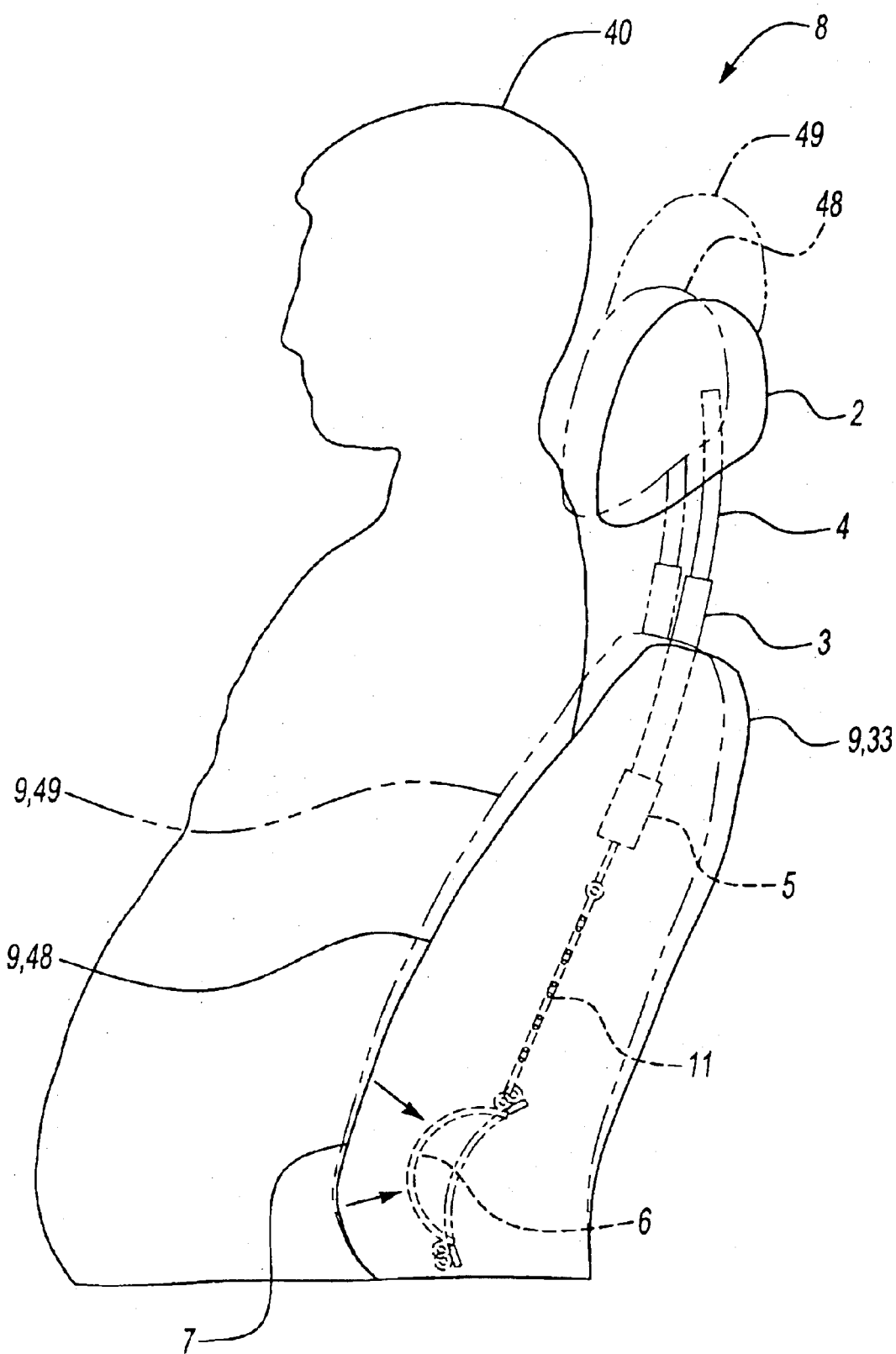
FIG. 4 is a partially cut-out side view of the head restraint positioning mechanism in the base state and in the release state.

The guide sleeves 3 present a slight curvature and serve to retain the head restraint rods 4, see particularly FIG. 4.

The head restraint rods 4 are adjustable within the guide sleeves 3, between different positions. In this way, adjustment for passengers of different sizes is facilitated so that the head restraint can always be arranged in the correct position relative to a passenger's head.

The lower ends of the guide sleeves 3 are inserted into sleeve retainers 28, 29 arranged on the side ends 30, 31 of the holding device 5. In the depicted embodiment, the guide sleeves 3 and sleeve retainers 28, 29 have anti-twisting cross-sections. The cross-section may be essentially rectangular.

To attach the guide sleeves 3 inside the sleeve retainers 28, 29, the two parts can be locked or clipped together. Furthermore, it is possible that, for example, using shrinkage fit or the like, there is an arrangement of the guide sleeves 3 in the sleeve retainers 28, 29 that is frictionally engaged, non-positive or interlocking.

The holding device 5 is essentially formed with a plate-shape, with the sleeve retainers 28, 29 on the side ends 30, 31. In the plate-shaped connection piece between the sleeve retainers 28, 29, a series of bore holes is formed for saving material and reducing the weight.

A lower end 20 of the holding device 5 presents a clip-on device to which an upper end 17 of the connection element 11 can be clipped. This upper end 17 and correspondingly also the lower end 18 of the connection element 11 present corresponding pivoting connection devices 19, which are formed in the depicted embodiment as clip connection elements 21, which are formed by circular bearing shells 23, 24. By clipping these bearing shells, for example, to the lower end 20 of the holding device 5, both the connection of these parts and the pivoting capability of both parts relative to one another are realized.

The bearing shells 23, 24 are arranged at the upper end 17 and the lower end 18 of the connection element 11. Bearing shell 23 can be clipped on to a clip-on shaft 38 on the upper end 14 of the impact device 6. The clip-on shaft 38 is integrated in the upper end 14 of the impact device 6 as a connecting device 15.

The connection element 11 is formed from a flat profile 16, which, in comparison to its dimensions in the longitudinal direction 39, presents a smaller thickness and also a smaller width. A series of bore holes 25 is formed in the connection element 11, see particularly FIG. 2, again for reducing the weight and saving material.

The impact device 6 presents a structural unit 10 with pressure-induced length variation, which is formed by an impact panel 12 with a convex curvature in the direction of the passenger. The impact panel 12 extends essentially up to the clip-on shaft 38 and, opposite, up to the lower end 26 of the impact device 6, on which a pivot shaft 27 is connected to it. In the direction of the connection element 11, the impact panel 12 presents a decreasing width.

With regard to FIGS. 1 and 2, still to be indicated are the guide elements 36, which stick out from the sides of the guide sleeves 3 and form a part of a link guide 35. In the depicted embodiment, the guide elements 36 are formed by guide strips that run diagonally to the length extension of the guide sleeves 3, which guide strips engage in corresponding guide grooves on the other part, see particularly FIG. 3 in this regard. In a different embodiment according to the invention, the corresponding guide element 36 can also be formed by a pin that sticks out to the side.

FIG. 3 shows a top view of a seat back 9 as a part of a vehicle seat 33, whereby particularly the different components of the frame 32 of this seat back 9 are depicted. The frame 32 presents essentially upper and lower cross-components 43, 44 and the lateral side components 46, 47 that connect them. In the upper cross-component 43, two openings 42 are formed at a distance from one another, in which retaining sleeves 37 are arranged. These serve the at least partial retention of guide sleeves 3 shown in FIGS. 1 and 2. These extend from the sleeve retainers 28, 29 of the holding device 5 at least into the retaining sleeves 37, whereby the link guide 35 is formed between these and the guide sleeves 3.

In FIG. 3, the pivot shaft 27, see also FIGS. 1 and 2, is visible at the lower end of the head restraint positioning mechanism 1 whose ends are held in shaft bearings 45. These shaft bearings 45 can be arranged directly on the lower cross-component 44 of the frame 32. In this way, there can be a detachable mounting of the head restraint positioning mechanism 1 directly to the frame 32 of the seat back 9. Likewise, it is possible to pre-mount the head restraint positioning mechanism 1 on a separate supporting device 34, see the dashed line representation in FIG. 3, and then to mount the supporting device 34, together with the head restraint positioning mechanism 1, to the vehicle seat 33.

In FIG. 4, the head restraint positioning mechanism 1 according to the invention is depicted in a simplified representation, both in a base position and in a release position. The seat back 9 is shown in solid lines is in the base position and the seat back 9 is shown in phantom lines in position 49 is in the release position. It is particularly evident that the impact device 6 is essentially allocated to a pelvis 7 of a passenger 8. In case of a rear-end impact to the corresponding vehicle, the pelvis 7 of the passenger 8 will first move in the direction of the seat back 9, because the center of gravity of the passenger is roughly located in the area of the pelvis. In this way, the curvature of the impact device 6, with convex curvature in the direction of the pelvis 7, is reduced, which leads to a pressure-induced length variation of the impact device 6. Because of the reduction of the curvature, there is an enlargement of the length of the impact device 6. Because of this enlargement of the length, the head restraint 2 is likewise shifted up and forward through the corresponding connection with the connection element 11, holding device 5 and guide sleeves 3, see the position of the head restraint 2 identified by reference number 48. The positioning of the head restraint results, due to the change in length of the impact device 6.

Furthermore, another setting of the head restraint 2 is shown in FIG. 4, see reference number 49, which corresponds to a convenient positioning of the head restraint for adjusting to the corresponding size of the passenger 8, in order to support the head 40 correctly at all times. There is also a corresponding release position for this additional position 49 after the release of the head restraint positioning mechanism 1, which, for simplification, is not depicted in FIG. 4.

It is also noted that the impact panel 12 is compressible into a flat position when corresponding pressure is applied by the passenger 8. Furthermore, with the new type of impact device 6, there is a fast and sure release of the head restraint positioning mechanism 1, so that in a short time and also through just a relatively slight positioning of the impact device 6, the head restraint 2 is moved up and forward to support the head 40 of the passenger 8, so that, for example, a whiplash injury can be prevented or at least avoided to a large degree.

Furthermore, it should be pointed out that because of the curvature and arrangement of the impact panel 12, it can simultaneously serve as support in the lumbar region of the passenger and thereby replace or at least supplement other corresponding devices in the vehicle seat.

What is claimed is:

1. A head restraint positioning device for a vehicle seat, the vehicle seat having a seat back having head restraint and a frame, the frame including an upper cross component, a lower cross component, and first and second side components disposed proximate the upper and lower cross components, the head restraint positioning device comprising:
a guide sleeve extending through the upper cross component, the guide sleeve being adapted to permit adjustment of the head restraint;
a holding device adapted to receive the guide sleeve;
a connection element coupled to the holding device;
an impact device coupled to the connection element at an upper end and pivotally connected to the lower cross component at a lower end,
wherein the head restraint positioning device is spaced apart from the first and second side components and the impact device varies in length in response to the application of force by a pelvis of a seat occupant during a vehicle impact event to move the head restraint from a base position to a release position.

2. Head restraint positioning device according to claim 1, wherein the connection element includes first and second bearing shells disposed proximate the upper and lower ends.

3. Head restraint positioning device according to claim 2 further comprising a shaft bearing disposed proximate the lower cross component and a pivot shaft extending through, the impact panel and pivotally disposed in the shaft bearing.

4. Head restraint positioning device according to claim 2, wherein the impact panel has a connection device for the pivoting connection to the connection element at least on an upper end.

5. Head restraint positioning device according to claim 2, wherein the connection element has a flat profile.

6. Head restraint positioning device according to claim 2, wherein the connection element has an upper pivoting connection device on an upper end and a lower pivoting connection device on a lower end for detachably mounting the connecting device of the impact panel and to an end of a holding device pointing to the connection element.

7. Head restraint positioning device according to claim 6, wherein at least one of the pivoting connection devices is formed by clip connection elements.

8. Head restraint positioning device according to claim 7, wherein the clip connection element has a circular cross-section.

9. Head restraint positioning device according to claim 2, wherein the connection element has a number of bore holes extending diagonally relative to the length of the connection element.

10. Head restraint positioning device according to claim 1, wherein the impact panel is convexly curved in the direction of the seat occupant.

11. Head restraint positioning device according to claim 1, wherein the impact device is held on a lower end on a pivot shaft for a pivoting connection.

12. Head restraint positioning device according to claim 1, wherein a holding device has at least one sleeve retainer that retains a guide sleeve and resists twisting of the guide sleeve.

13. Head restraint positioning device according to claim 12, wherein first and second sleeve retainers are each arranged on a first and second side ends of the holding device, respectively.

14. Head restraint positioning device according to claim 1, wherein a guide sleeve is assembled into a sleeve retainer and is held by the sleeve retainer in a frictionally engaged, manner.

15. Head restraint positioning device according to claim 14, wherein the guide sleeve and sleeve retainer have an anti-twisting cross-section.

16. Head restraint positioning device according to claim 14, wherein the guide sleeve can be locked in the sleeve retainer.

17. Head restraint positioning device according to claim 1, wherein a guide sleeve supports a head restraint rod in a sliding relationship.

18. Head restraint positioning device according to claim 1, wherein the head restraint positioning device is detachably mounted on a frame of the vehicle seat.

19. Head restraint positioning device according to claim 18, wherein the head restraint positioning device is mounted on a supporting device that can be mounted to the frame of the vehicle seat.

20. Head restraint positioning device according to claim 1, wherein a link guide is formed between a guide sleeve and vehicle seat.

21. Head restraint positioning device according to claim 1, wherein at least one guide element sticks out from a guide sleeve, the guide element engaging a corresponding guide element on a frame of the vehicle seat.

22. Head restraint positioning device according to claim 21, wherein the upper cross component further comprises a retaining sleeve arranged to at least partially retain the guide sleeve, whereby a link guide is formed between a retaining sleeve and the guide sleeve.

23. Head restraint positioning device according to claim 1, wherein at least a structural unit of the impact device is formed from an elastically workable material.

24. Head restraint positioning device according to claim 1, wherein the impact device has a clip-on shaft on an upper end that is connected to a lower end of a connection element.

* * * * *

UNITED STATES PATENT AND TRADEMARK OFFICE
CERTIFICATE OF CORRECTION

PATENT NO.   : 6,871,913 B2
DATED        : March 29, 2005
INVENTOR(S)  : Heiko Malsch et al.

It is certified that error appears in the above-identified patent and that said Letters Patent is hereby corrected as shown below:

Column 8,
Line 67, delete "each".

Signed and Sealed this

Thirty-first Day of May, 2005

JON W. DUDAS
*Director of the United States Patent and Trademark Office*